United States Patent
Wang et al.

(10) Patent No.: US 7,823,255 B2
(45) Date of Patent: Nov. 2, 2010

(54) HINGE ASSEMBLY FOR ELECTRONIC DEVICE

(75) Inventors: Jin-Xin Wang, Shenzhen (CN); Gui-Li Yang, Shenzhen (CN); Liang Wei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/327,644

(22) Filed: Dec. 3, 2008

(65) Prior Publication Data

US 2010/0043175 A1     Feb. 25, 2010

(30) Foreign Application Priority Data

Aug. 25, 2008   (CN)   ................. 2008 1 0304171

(51) Int. Cl.
*E05D 3/10* (2006.01)
(52) U.S. Cl. ........................................... 16/367
(58) Field of Classification Search ............ 16/367, 16/302, 366, 339, 340, 330; 361/679.27
See application file for complete search history.

(56) References Cited

U.S. PATENT DOCUMENTS

| | | | |
|---|---|---|---|
| 6,845,546 B1 * | 1/2005 | Lu et al. ................. | 16/367 |
| 7,478,458 B2 * | 1/2009 | Tajima ................... | 16/367 |
| 7,533,450 B2 * | 5/2009 | Chien ..................... | 16/367 |
| 7,581,291 B2 * | 9/2009 | Abe et al. ............... | 16/367 |
| 7,624,477 B2 * | 12/2009 | Chien et al. ............ | 16/286 |
| 2005/0119023 A1 * | 6/2005 | Sudo et al. ............. | 455/550.1 |
| 2007/0033771 A1 * | 2/2007 | Hung .................... | 16/367 |
| 2008/0000050 A1 * | 1/2008 | Hsu ....................... | 16/367 |
| 2008/0078060 A1 * | 4/2008 | Chen ..................... | 16/367 |
| 2008/0098566 A1 * | 5/2008 | Chiang et al. .......... | 16/277 |
| 2008/0271293 A1 * | 11/2008 | Hsu et al. ............... | 16/367 |

\* cited by examiner

*Primary Examiner*—Victor Batson
*Assistant Examiner*—Matthew Sullivan
(74) *Attorney, Agent, or Firm*—Clifford O. Chi

(57) ABSTRACT

An exemplary hinge assembly includes a frame, a first rotating module, and a second rotating module. The first rotating module includes a first pivotal shaft non-rotatably connected to the frame. The second rotating module includes a second pivotal shaft substantially perpendicular to the first pivotal shaft, a plurality of resilient washers, a supporting member, a rotating member engaging with the supporting member, and a limiting member. A first end of the second pivotal shaft is fixed on the frame. The resilient washers, the rotating member, the supporting member, and the limiting member are orderly sleeved on a second end, opposite to that of the first end, of the second pivotal shaft. A position of the limiting member relative to the second pivotal shaft is adjustable. The second pivotal shaft is capable of driving the rotating member to rotate.

14 Claims, 5 Drawing Sheets

HINGE ASSEMBLY FOR ELECTRONIC DEVICE

BACKGROUND

1. Technical Field

The present disclosure relates to a hinge assembly and, more particularly, to a hinge assembly employed in an electronic device.

2. Description of the Related Art

An electronic device such as a mobile phone, a notebook computer, or a personal digital assistant generally has a main body and a display body (or panel) pivotally mounted on the main body by a hinge assembly.

A typical hinge assembly includes a bracket, a first rotating module, and a second rotating module. The first and second rotating modules are positioned on the bracket. The first rotating module is fixed to the display body of the electronic device. The second rotating module is fixed to the main body of the electronic device. The first and second rotating modules provide rotation about two rotational axes. However, the external force enabling the second rotating module to rotate can not be adjusted to meet different requirements.

Therefore, a hinge assembly to solve the aforementioned problem is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
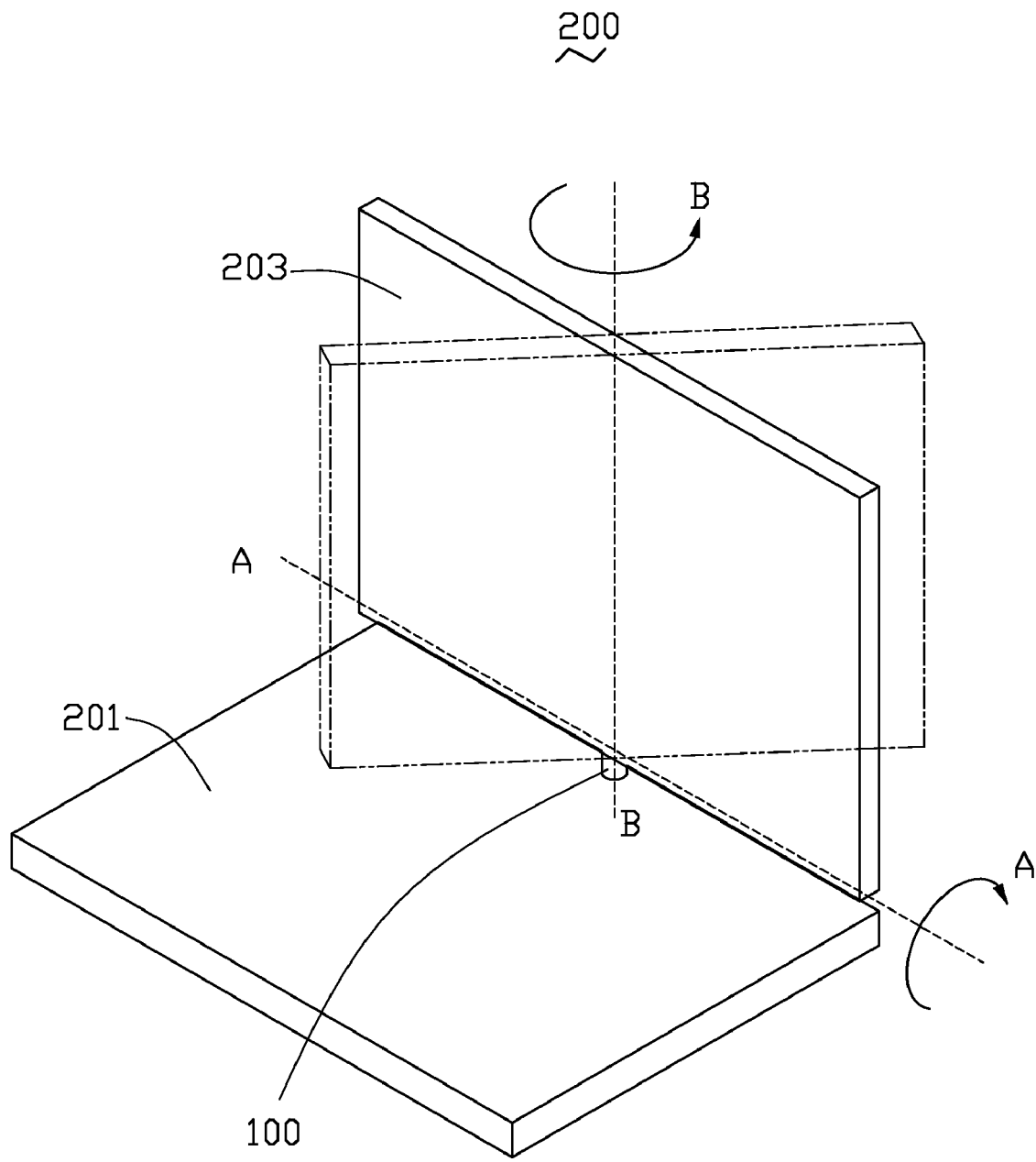
FIG. 1 is a notebook computer including one embodiment of a hinge assembly when the display body of the notebook computer is rotated.

Referring to FIG. 1, one embodiment of a hinge assembly 100, which may be employed in an electronic device, such as a notebook computer 200, is shown. The notebook computer 200 includes a main body 201, a display body 203, and the hinge assembly 100. The hinge assembly 100 is rotatably connected between the main body 201 and the display body 203, such that the display body 203 is rotatable relative to the main body 201 around the first line A-A and the second line B-B.

Figure 2:
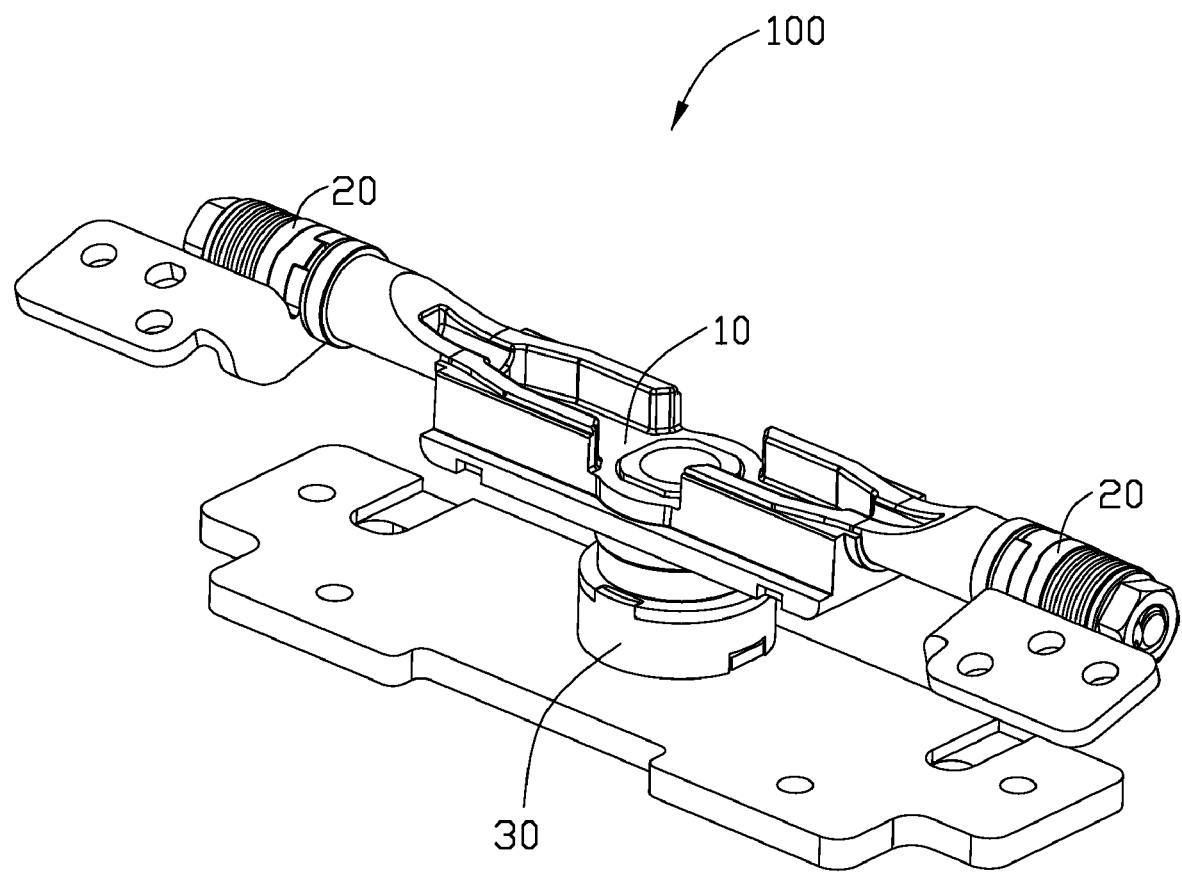
FIG. 2 is an assembled, isometric view of the hinge assembly of FIG. 1, the hinge assembly including a first rotating module and a second rotating module.

Referring also to FIG. 2, the hinge assembly 100 includes a frame 10, two first rotating modules 20, and a second rotating module 30. The first rotating modules 20 are positioned on each end of the frame 10 and are symmetrical to each other relative to the frame 10. The second rotating module 30 is connected to the frame 10, and is substantially perpendicular to the frame 10 and the first rotating modules 20. The first rotating modules 20 may be fixed to the display body 203 of the notebook computer 200, and the second rotating module 30 may be fixed to the main body 201 of the notebook computer 200.

Figure 3:
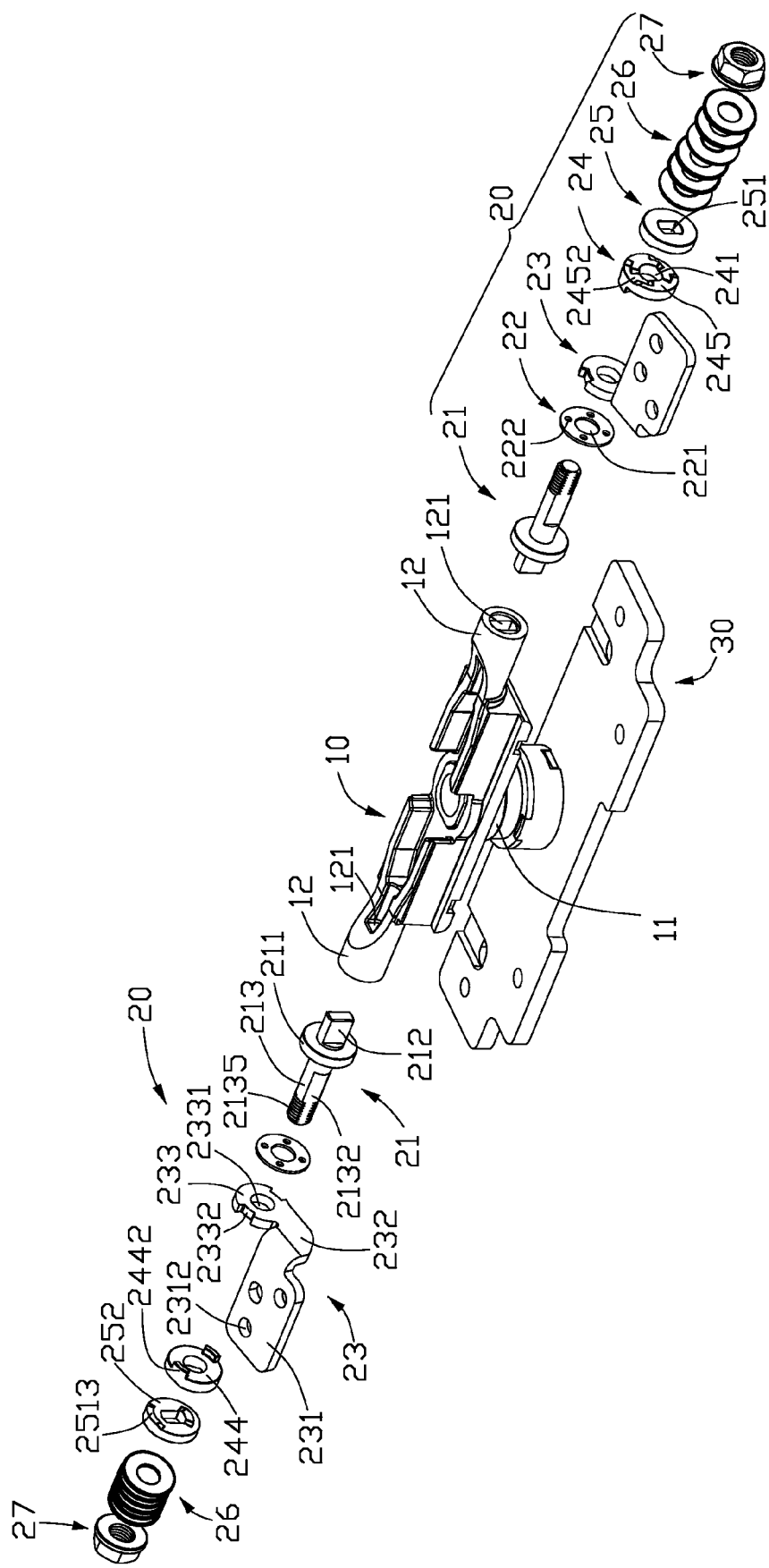
FIG. 3 is an exploded, isometric view of the first rotating module of the hinge assembly in FIG. 2.
Figure 4:
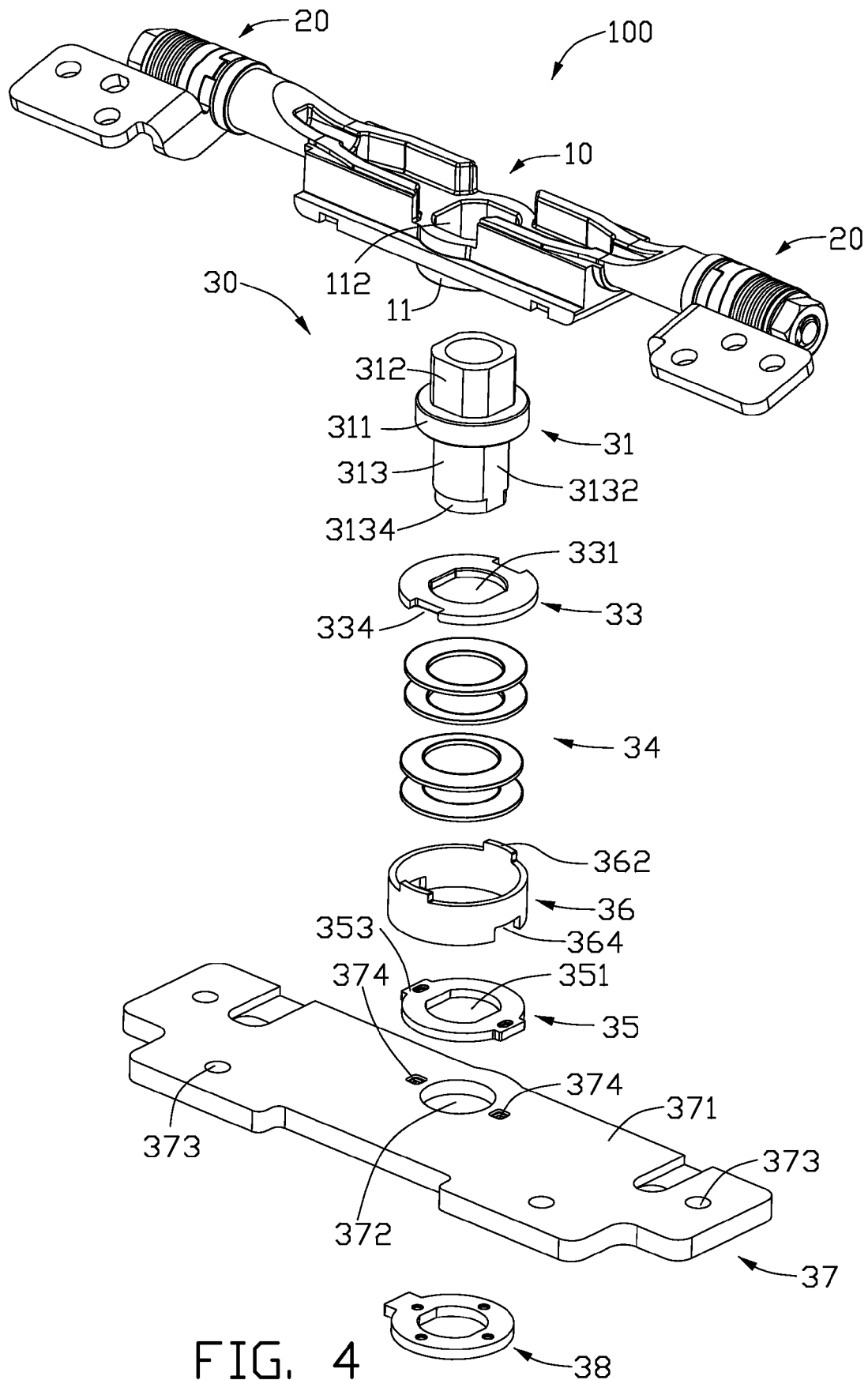
FIG. 4 is an exploded, isometric view of the second rotating module of the hinge assembly in FIG. 2.

Referring to FIGS. 3 and 4, the frame 10 may be substantially T-shaped. The frame 10 includes a sleeve portion 11 and two mounting portions 12 formed on opposite ends of the sleeve portion 11. The sleeve portion 11 defines a non-circular hole 112 in a middle portion of the sleeve portion 11. Each mounting portion 12 defines an assembly hole 121. An extending direction of the non-circular hole 112 is substantially perpendicular to an extending direction of the assembly hole 121.

Each first rotating module 20 includes a first pivotal shaft 21, a washer 22, a connecting member 23, a cam follower 24, a cam 25, a plurality of resilient rings 26, and a fixing member 27.

The first pivotal shaft 21 includes a flange 211, an assembly portion 212, and a shaft portion 213. The assembly portion 212 and the shaft portion 213 are on opposite sides of the flange 211. The flange 211 may be substantially disk-like in shape. The shaft portion 213 forms a threaded portion 2135 on a distal end portion opposite to the flange 211. A cross section of the shaft portion 213 may be non-circular. In this embodiment, the shaft portion 213 is flattened along a section of a substantially cylindrical surface area, thus forming a flat surface 2132 and a deformed shaft portion.

The washer 22 may be substantially ring-shaped, and defines a circular through hole 221 in a middle portion. The substantially circular through hole 221 of the washer 22 is configured for rotatably engaging with the shaft portion 213. In addition, the washer 22 defines a plurality of oil holes 222 configured for storing lubricants.

The connecting member 23 includes a fixing portion 231, a connecting portion 232, and an extending portion 233. The connecting portion 232 is substantially perpendicular to the fixing portion 231. The extending portion 233 is formed on an end of the connecting portion 232 and may be substantially ring-shaped. The fixing portion 231 defines a plurality of assembly holes 2312, so that the connecting member 23 may be easily fixed to the display body 203. The extending portion 233 defines a through hole 2331. Additionally, a periphery of the extending portion 233 defines two symmetrical latching grooves 2332.

The cam follower 24 may be substantially ring-shaped, and defines a circular through hole 241 in a middle portion therein. The cam follower 24 includes a first surface 244 and a second surface 245. The first surface 244 and the second surface 245 are formed on opposite sides of the cam follower 24. A periphery of the first surface 244 forms two latching tabs 2442. The latching tabs 2442 are configured to be latched in the latching grooves 2332. The cam follower 24 defines a plurality of wedge grooves 2452 in the second surface 245.

The cam 25 may be substantially ring-shaped, and defines a non-circular hole 251 in a middle portion therein. The cam 25 includes a cam surface 252 corresponding to the second surface 245 of the cam follower 24. The non-circular hole 251 is configured for receiving the shaft portion 213 of the first pivotal shaft 21, so that the cam 25 is non-rotatably connected to the first pivotal shaft 21. The cam surface 252 of the cam 25 forms a pair of wedge blocks 2513 configured to engage in the wedge grooves 2452 of the cam follower 24.

Alternatively, the wedge block 2513 may also be formed on the cam follower 24, and the wedge groove 2452 may also be defined in the cam 25.

The resilient rings 26 may be substantially ring-shaped, and are sleeved on the shaft portion 213 of the first pivotal shaft 21. A middle portion of each resilient ring 26 protrudes toward one side. The resilient rings 26 are configured to provide an axial force along a direction of the first line A-A in FIG. 1. In this embodiment, the plurality of resilient rings 26 includes six resilient rings 26. The number of the resilient rings 26 may vary to adjust the axial force.

The fixing member 27 may be substantially ring-shaped and defines a through hole (not shown) in middle portion therein. The fixing member 27 is configured for engaging with the threaded portion 2135 of the first pivotal shaft 21 so that the washer 22, the connecting member 23, the cam follower 24, the cam 25, and the resilient rings 26 are prevented from detaching out of the first pivotal shaft 21. In one embodiment, the fixing member 27 may be a nut.

Figure 5:
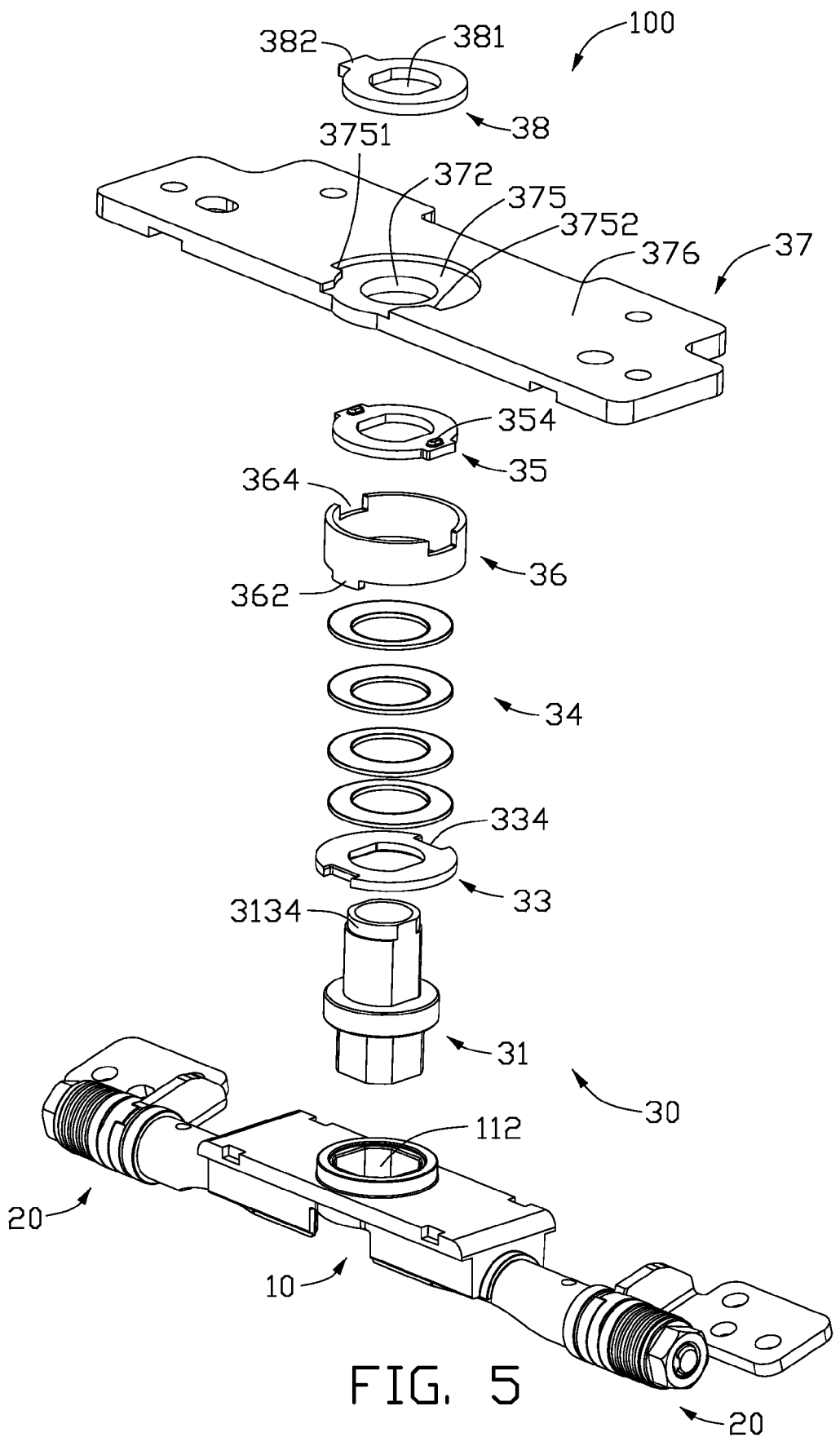
FIG. 5 is similar to FIG. 4, but shown from another aspect.

Referring to FIGS. 4 and 5, the second rotating module 30 includes a second pivotal shaft 31, a latching member 33, a plurality of resilient washers 34, a rotating member 35, a sleeve 36, a supporting member 37, and a limiting member 38.

The second pivotal shaft 31 includes a flange 311, an assembly portion 312, and a shaft portion 313. The assembly portion 312 and the shaft portion 313 are on opposite sides of the flange 311. The assembly portion 312 is configured for engaging in the non-circular hole 112 of the frame 10, so that the second pivotal shaft 31 follows the rotation of the frame 10. The shaft portion 313 is flattened along a section of a substantially cylindrical surface area, thus forming a flat surface 3132 and a deformed shaft portion. A connecting shaft 3134 extends from the free end of the shaft portion 313 along an axial direction of the shaft portion 313. A diameter of the connecting shaft 3134 is smaller than a diameter of the shaft portion 313.

The latching member 33 may be substantially ring-shaped. The latching member 33 defines a non-circular hole 331 in a middle portion and two latching grooves 334 in a cylindrical surface. The latching grooves 334 are symmetrical to each other relative to the non-circular hole 331. The non-circular hole 331 of the latching member 33 is configured for receiving the shaft portion 313 of the second pivotal shaft 31, so that the latching member 33 follows the rotation of the second pivotal shaft 31.

The resilient washers 34 may be similar in shape to the resilient rings 26. In this embodiment, of the plurality of resilient washers 34 includes four resilient washers. A middle portion of each resilient washer 34 protrudes toward one side thereof.

The rotating member 35 may be substantially ring-shaped, and defines a non-circular hole 351 in a central portion. Two engaging pieces 353 extend out from opposite sides of the rotating member 35. The rotating member 35 forms a pair of peaks 354 on an end surface.

The sleeve 36 may be cylindrical in shape, and further defines a hollow space. The sleeve 36 forms two opposite protrusions 362 extending out from a first end of the sleeve 36. The sleeve 36 defines two opposite cutouts 364 in a second end opposite to the first end of the sleeve 36.

The supporting member 37 may be substantially rectangular plate. The supporting member 37 includes a top surface 371 and a bottom surface 376 opposite to the top surface 371. The supporting member 37 defines a through hole 372 in a central portion and a plurality of assembly holes 373. The supporting member 37 further defines two valleys 374 in the top surface 371 and a limiting groove 375 in the bottom surface 376. The two valleys 374 are symmetrical to each other relative to the through hole 372. The limiting groove 375 may be substantially circular. The limiting groove 375 and the through hole 372 are coaxially arranged. The limiting groove 375 includes a first limiting surface 3751 and a second limiting surface 3752.

The limiting member 38 may be substantially ring-shaped, and defines a non-circular hole 381. A resisting portion 382 extends out from a periphery of the limiting member 38. The limiting member 38 is configured to be receivable in the limiting groove 375 of the supporting member 37. The first limiting surface 3751 and the second limiting surface 3752 are configured to resist the limiting member 38. The limiting member 38 is non-rotatably connected to the second pivotal shaft 31, thereby restricting a rotatable range of the second pivotal shaft 31 relative to the supporting member 37.

Referring also to FIGS. 1 and 5, the assembly portion 212 of the first pivotal shaft 21 is inserted into the assembly hole 121 of the frame 10, so that the first pivotal shaft 21 follows the rotation of the frame 10. The shaft portion 213 of the first pivotal shaft 21 is passed through the washer 22, the connecting member 23, the cam follower 24, the cam 25, and the resilient rings 26. The latching tabs 2442 of the cam follower 24 are latched in the latching grooves 2332 of the connecting member 23, so that the cam follower 24 follows the rotation of the connecting member 23 about the first line A-A. The fixing member 27 engages with the threaded portion 2135 of the first pivotal shaft 21. The resilient rings 26 are capable of exerting an elastic force on the cam 25. Thus, the cam 25 engages with the cam follower 24.

The latching member 33, the resilient washers 34, and the rotating member 35 are orderly sleeved on the shaft portion 313 of the second pivotal shaft 31. Then, the sleeve 36 is sleeved on the second pivotal shaft 31. The protrusions 362 of the sleeve 36 engage in the latching grooves 334 of the latching member 33. The cutouts 364 of the sleeve 36 engage with the engaging pieces 353 of the rotating member 35. The latching member 33 follows the rotation of the second pivotal shaft 31. Thus, the sleeve 36 follows the rotation of the second pivotal shaft 31. Then, the shaft portion 313 of the second pivotal shaft 31 is passed through the through hole 372 of the supporting member 37. The peaks 354 of the rotating member 35 engage in the valleys 374 of the supporting member 37. The limiting member 38 is received in the limiting groove 375 of the supporting member 37, and the limiting member 38 is connected to the connecting shaft 3134 of the second pivotal shaft 31, for example, by riveting.

The resilient washers 34 resist the latching member 33 and the rotating member 35. The resilient washers 34 are capable of exerting an elastic force on the rotating member 35. Thus, the rotating member 35 engages with the supporting member 37.

The connecting members 23 of the first rotating modules 20 are connected to the display body 203 of the notebook computer 200 via the assembly holes 2312. The supporting member 37 of the second rotating module 30 is connected to the main body 201 of the notebook computer 200 via the assembly holes 373.

When a force is applied on the display body 203 to rotate the display body 203 relative to the first line A-A, the display body 203 drives the connecting member 33 to rotate relative to the first pivotal shaft 21, the frame 10, and the main body 201. Due to the axial force from the washer 22, when the display body 203 is rotated, the connecting member 23, the cam follower 24, the cam 25, resilient rings 26, and the fixing member 27 cooperatively provide an amount of friction that allows movement of the display body 203 relative to the main body 201 when the display body 203 is rotated with a moderate force, and further allows the display body 203 to be stably maintained in a desired position relative to the main body 201.

When the display body 203 rotates about the first line A-A, the peaks 2513 of the cam 25 slide out of the valleys 2452 of the cam follower 24, and the resilient rings 26 are decompressed further. The cam 25 can be retained at any position relative to the cam follower 24 during rotation of the display body 203, because the second surface 245 of the cam follower 24 is approximately flat. Therefore, the display body 203 can be rotated about the first line A-A and retained in any desired position relative to the main body 201 between the closed state and an open state. When the display body 203 rotates through each of the predetermined positions, the peaks 2513 of the cam 25 fit into the valleys 2452 of the cam follower 24. In the predetermined positions, the resilient rings 26 are decompressed. As such, it is more difficult to rotate the display body 203 in the predetermined positions than in other positions because the peaks 2513 are held in the valleys 2452. Therefore, the display body 203 can be stably positioned at the predetermined angles relative to the main body 201. In this embodiment, the predetermined angles are 0 degree and 180 degrees. Alternatively, the predetermined angles may be changed by adjusting the location and number of the valleys 2452 and the peaks 2513.

When a force is applied on the display body 203 to drive the display body 203 to rotate about the second line B-B, the display body 203 drives the second pivotal shaft 31 to rotate relative to the second line B-B. Simultaneously, the second pivotal shaft 31 drives the latching member 33, the rotating member 35, the sleeve 36, and the limiting member 38 to rotate. When the display body 203 is rotated, the rotating member 35 engages with the supporting member 37, due to the axial force provided by the resilient washers 34.

The rotating member 35 can be retained at any position relative to the supporting member 37 during rotation of the display body 203, because the top surface 371 of the supporting member 37 is approximately flat. When the display body 203 rotates through each of the predetermined positions, the peaks 354 of the rotating member 35 fit into the valleys 374 of the supporting member 37. In the predetermined positions, the resilient washers 34 are decompressed. As such, it is more difficult to rotate the display body 203 in the predetermined positions than in other positions because the peaks 354 are held in the valleys 374. Therefore, the display body 203 can be stably positioned at the predetermined angles relative to the main body 201. In this embodiment, the predetermined angles are 0 degree and 180 degrees. Alternatively, the predetermined angles may be changed by adjusting the location and number of the valleys 374 and the peaks 354. The valleys 374 and the peaks 354 may be formed by punching.

When the display body 203 is rotated to an angle about the first line B-B, the resisting portion 382 of the limiting member 38 resists the first limiting surface 3751 and the second limiting surface 3752 of the supporting member 37, thereby limiting the rotatable angle of the display body 203 relative to the second line B-B.

In this embodiment, a position of the limiting member 38 relative to the second pivotal shaft 31 is adjustable. An external force enabling the display body 203 to rotate about the second line B-B is determined by the frictional forces between the members of the second rotating module 30. The frictional forces can vary by adjusting the limiting member 38, enabling the external force to be adjusted to meet different requirements.

It may be appreciated that one of the two first rotating modules 20 can be omitted. In such cases, one of the mounting portions 12 of the frame 10 can be omitted. The first pivotal shafts 21 can be welded on the mounting portions 12 of the frame 10 directly. The second pivotal shafts 31 can also be welded on the sleeve portion 11 of the frame 10 directly. As a result, there is no need to define the non-circular hole 112 and the assembly holes 121. Alternatively, the first pivotal shafts 21, 31 can also be integrally formed with the frame 10.

It is believed that the present embodiments and their advantages will be understood from the foregoing description, and it will be apparent that various changes may be made thereto without departing from the spirit and scope of the embodiments or sacrificing all of its material advantages, the examples hereinbefore described merely being preferred or exemplary embodiments.

What is claimed is:

1. A hinge assembly, comprising:
a frame;
a first rotating module comprising a first pivotal shaft non-rotatably connected to the frame; and
a second rotating module comprising:
a second pivotal shaft being substantially perpendicular to the first pivotal shaft, a first end of the second pivotal shaft being fixed on the frame, the second pivotal shaft comprising a flange;
a plurality of resilient washers a sleeve;
a latching member sleeved on the second pivotal shaft, wherein the latching member is positioned between the flange of the second pivotal shaft and the sleeve, and rotatable with the second pivotal shaft, the latching member defines two latching grooves in a cylindrical surface;
a rotating member engaging with the supporting member, the rotating member comprising two engaging pieces extending out from opposite sides;
wherein the sleeve sleeved on the second pivotal shaft and following the rotation of the second pivotal shaft, wherein the resilient washers and the rotating member are received in the sleeve, the sleeve forms two opposite protrusions extending out from a first end of the sleeve and engaging in the latching grooves of the latching member, and the sleeve defines two opposite cutouts in a second end opposite to the first end of the sleeve and engages with the engaging pieces of the rotating member;
a supporting member; and
a limiting member;
wherein the latching member, the plurality of resilient washers, the sleeve, the rotating member, the supporting member, and the limiting member are orderly sleeved on a second end of the second pivotal shaft; the limiting member prevents the resilient washers, the rotating member, and the supporting member from detaching out of the second pivotal shaft; the second pivotal shaft is capable of driving the rotating member to rotate.

2. The hinge assembly of claim 1, wherein the supporting member defines a limiting groove; the limiting member is received in the limiting groove of the supporting member; the limiting member is non-rotatably connected to the second pivotal shaft, thereby restricting a rotation range of the second pivotal shaft relative to the supporting member.

3. The hinge assembly of claim 2, wherein the limiting member comprises a resisting portion; the limiting groove of the supporting member includes a first limiting surface and a second limiting surface; the first limiting surface and the second limiting surface are configured to resist the resisting portion of the limiting member.

4. The hinge assembly of claim 1, wherein the limiting member is riveted to the second pivotal shaft.

5. The hinge assembly of claim 1, wherein one of the rotating member and the supporting member forms at least one peak, and the other one of the rotating member and the supporting member defines at least one valley for receiving the at least one peak.

6. The hinge assembly of claim 5, wherein the at least one valley and the at least one peak are formed by punching.

7. The hinge assembly of claim 1, wherein the second rotating module further comprises a latching member sleeved on the second pivotal shaft, the second pivotal shaft comprises a flange; the latching member is positioned between the flange of the second pivotal shaft and the sleeve, and rotatable with the second pivotal shaft.

8. The hinge assembly of claim 1, wherein a middle portion of each resilient washer protrudes toward one side thereof.

9. The hinge assembly of claim 1, wherein the first rotating module further comprises a connecting member and a plurality of resilient rings sleeved on the first pivotal shaft; the resilient rings provide an axial force.

10. The hinge assembly of claim 9, wherein the first rotating module further comprises a cam and a cam follower, one of the cam and the cam follower forms at least one wedge block, and the other one of the cam and the cam follower defines at least one wedge groove corresponding to the at least one wedge block.

11. A hinge assembly, comprising:
a frame;
two first rotating modules positioned on the frame;
a second rotating module comprising:
 a pivotal shaft including a first end fixed to the frame, the second pivotal shaft comprising a flange;
 a plurality of resilient washers a sleeve;
 a latching member sleeved on the second pivotal shaft, wherein the latching member is positioned between the flange of the second pivotal shaft and the sleeve, and rotatable with the second pivotal shaft, the latching member defines two latching grooves in a cylindrical surface;
 a rotating member engaging with the supporting member, the rotating member comprising two engaging pieces extending out from opposite sides;
 wherein the sleeve sleeved on the second pivotal shaft and following the rotation of the second pivotal shaft, wherein the resilient washers and the rotating member are received in the sleeve, the sleeve forms two opposite protrusions extending out from a first end of the sleeve and engaging in the latching grooves of the latching member, and the sleeve defines two opposite cutouts in a second end opposite to the first end of the sleeve and engages with the engaging pieces of the rotating member;
 a limiting member;
 wherein the latching member, the resilient washers, the sleeve, the rotating member, and the limiting member are orderly sleeved on a second end opposite to the first end of the pivotal shaft; the limiting member prevents the resilient washers from detaching out of the pivotal shaft.

12. The hinge assembly of claim 11, wherein the first rotating module further comprises a cam and a cam follower, one of the cam and the cam follower forms at least one wedge block, and the other one of the cam and the cam follower defines at least one wedge groove.

13. The hinge assembly of claim 11, wherein the second rotating module further comprises a supporting member sleeved on the pivotal shaft; the supporting member is positioned between the resilient washers and the limiting member; the supporting member defines a limiting groove; the limiting member is received in the limiting groove of the supporting member; the limiting member is non-rotatably connected to the pivotal shaft, thereby restricting a rotation range of the pivotal shaft relative to the supporting member.

14. The hinge assembly of claim 13, wherein the limiting member comprises a resisting portion; the limiting groove of the supporting member includes a first limiting surface and a second limiting surface, and the first limiting surface and the second limiting surface are configured to resist the resisting portion of the limiting member.

* * * * *